United States Patent
Fujishiro

(10) Patent No.: US 12,349,221 B2
(45) Date of Patent: Jul. 1, 2025

(54) METHOD AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 405 days.

(21) Appl. No.: 18/058,833

(22) Filed: Nov. 25, 2022

(65) Prior Publication Data

US 2023/0123758 A1     Apr. 20, 2023

Related U.S. Application Data

(63) Continuation of application No. PCT/JP2021/019254, filed on May 20, 2021.

(30) Foreign Application Priority Data

May 26, 2020 (JP) ................................. 2020-091386

(51) Int. Cl.
H04W 76/15 (2018.01)
H04W 76/20 (2018.01)

(52) U.S. Cl.
CPC ........... *H04W 76/15* (2018.02); *H04W 76/20* (2018.02)

(58) Field of Classification Search
CPC .............................. H04W 76/15; H04W 76/20
USPC ....................................................... 370/329
See application file for complete search history.

(56) References Cited

U.S. PATENT DOCUMENTS 11,096,016 B2 * 8/2021 Chen ..................... H04W 72/21
2020/0196374 A1 * 6/2020 Lim ...................... H04W 80/02

FOREIGN PATENT DOCUMENTS

EP     3826217 A1 *  5/2021 ............. H04L 5/001

OTHER PUBLICATIONS

3GPP TSG RAN; NR; NR and NG-RAN Overall Description; Stage 2, Release 16, Technical specification "TS 38.300 V16.0.0", Dec. 2019, pp. 1-101.
Nokia, Alcatel-Lucent Shanghai Bell, "Solutions for wider bandwidth options", 3GPP TSG-RAN WG1 Meeting #88, R1-1703193, Feb. 13-17, 2017, total 13 pages, Athens, Greece.
Nokia, Nokia Shanghai Bell, "On UE adaptation to the traffic", 3GPP TSG RAN WG1 #96, R1-1903134, Feb. 25-Mar. 1, 2019, total 10 pages, Athens, Greece.
Oppo, "Introduction of dormant BWP operation and Async CA", 3GPP TSG-RAN WG2 Meeting #109 electronic, R2-2002382, Feb. 24-Mar. 6, 2020, total 24 pages.
3GPP TSG RAN; NR; Physical layer procedures for control, Release 16, 3GPP TS 38. 213 V16.1.0, Mar. 2020, pp. 11-14.
CATT, "Dormant SCG state", 3GPP TSG-RAN WG2 Meeting #107bis, R2-1912118, Oct. 14-18, 2019, total pp. 4, Chongqing, P.R., China.

* cited by examiner

*Primary Examiner* — Peter G Solinsky
(74) *Attorney, Agent, or Firm* — Studebaker Brackett PLLC

(57) ABSTRACT

A user equipment includes a transmitter configured to transmit, to a network, information indicating desired operation related to a secondary cell. The desired operation includes any one of first operation of activating the secondary cell configured for the user equipment, second operation of deactivating the secondary cell configured for the user equipment, and third operation of configuring the secondary cell for the user equipment.

4 Claims, 11 Drawing Sheets

METHOD AND USER EQUIPMENT

RELATED APPLICATIONS

The present application is a continuation based on PCT Application No. PCT/JP2021/019254, filed on May 20, 2021, which claims the benefit of Japanese Patent Application No. 2020-091386 filed on May 26, 2020. The content of which is incorporated by reference herein in their entirety.

TECHNICAL FIELD

The present invention relates to a method and a user equipment in a mobile communication system.

BACKGROUND OF INVENTION

The 3rd Generation Partnership Project (3GPP) being a standardization project for mobile communication systems defines communication in which a user equipment simultaneously uses a plurality of cells (a primary cell and at least one secondary cell). A case in which the plurality of cells belong to the same base station is referred to as carrier aggregation (CA). A case in which the plurality of cells belong to two base stations is referred to as dual connectivity (DC).

The user equipment configures secondary cells (SCells) based on configuration information from the base station. The user equipment activates/deactivates the SCells in response to an indication from the base station (NPL 1).

CITATION LIST

Non-Patent Literature

NPL 1: 3GPP Technical specification "TS 38.300 V16.0.0" January 2020

SUMMARY

A method according to a first aspect is a method executed in a user equipment. The method includes transmitting, to a network, information indicating desired operation related to a secondary cell. The desired operation includes any one of first operation of activating the secondary cell configured for the user equipment, second operation of deactivating the secondary cell configured for the user equipment, and third operation of configuring the secondary cell for the user equipment.

A method according to a second aspect is a method executed in a user equipment. The method includes receiving, from a network, information for intermittently activating a secondary cell configured for the user equipment, activating the secondary cell in an activation period determined based on the information, and deactivating the secondary cell in a period other than the activation period.

A method according to a third aspect is a method executed in a user equipment. The method includes receiving, from a network, information of transitioning a primary secondary cell configured for the user equipment to a dormant state, and transitioning the primary secondary cell to the dormant state, based on the information.

A user equipment according to a fourth aspect includes a transmitter configured to transmit, to a network, information indicating desired operation related to a secondary cell. The desired operation includes any one of first operation of activating the secondary cell configured for the user equipment, second operation of deactivating the secondary cell configured for the user equipment, and third operation of configuring the secondary cell for the user equipment.

A user equipment according to a fifth aspect includes a receiver configured to receive, from a network, information for intermittently activating a secondary cell configured for the user equipment, and a controller configured to activate the secondary cell in an activation period determined based on the information, and deactivate the secondary cell in a period other than the activation period.

A user equipment according to a sixth aspect includes a receiver configured to receive, from a network, information of transitioning a primary secondary cell configured for the user equipment to a dormant state, and a controller configured to transition the primary secondary cell to the dormant state, based on the information.

DESCRIPTION OF EMBODIMENTS

The current 3GPP specifications do not define a method in which a user equipment notifies a network of operation related to an SCell that the user equipment desires (for example, operation of activating the SCell). For example, when an application requiring high throughput communication is suddenly activated and the SCell configured for the user equipment is deactivated, the user equipment cannot immediately activate the SCell.

An object of the present disclosure is to appropriately control the operation related to the SCell.

A mobile communication system according to embodiments will be described with reference to the drawings. In the description of the drawings, the same or similar parts are denoted by the same or similar reference signs.

Mobile Communication System First, a configuration of a mobile communication system according to an embodiment will be described. Although the mobile communication system according to the embodiment is a 5G system of 3GPP, LTE may be at least partially applied to the mobile communication system.

Figure 1:
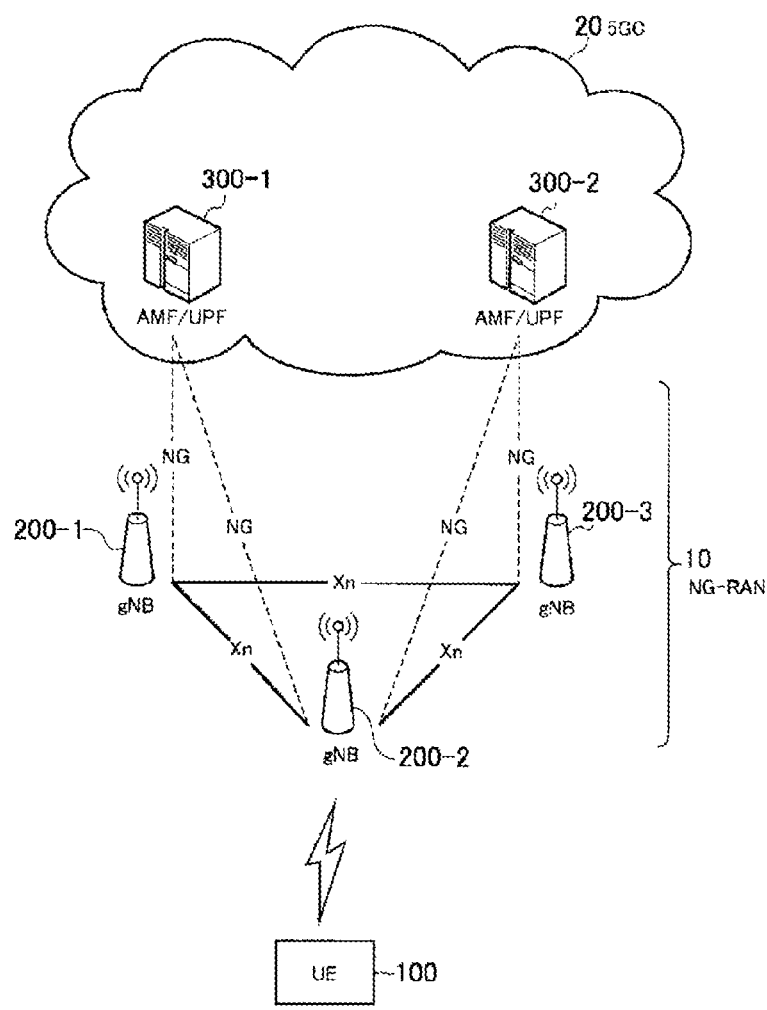
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a user equipment (UE) 100, a 5G radio access network (next generation radio access network (NG-RAN)) 10, and a 5G core network (5G core network (5GC)) 20.

The UE 100 is a mobile apparatus. The UE 100 may be any apparatus as long as the UE 100 is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. A "cell" is used as a term to indicate a minimum unit of a wireless communication area. A "cell" is also used as a term to indicate a function or a resource for performing wireless communication with the UE 100. One cell belongs to one carrier frequency.

Note that the gNB may be connected to an Evolved Packet Core (EPC) which is a core network of LTE, or a base station of LTE may be connected to the 5GC. The base station of LTE and the gNB may be connected via the inter-base station interface.

The 5GC 20 includes an Access and Mobility Management Function (AMF) and a User Plane Function (UPF) 300. The AMF performs various kinds of mobility control and the like for the UE 100. The AMF manages information of the area in which the UE 100 exists by communicating with the UE 100 by using Non-Access Stratum (NAS) signaling. The UPF controls data transfer. The AMF and UPF are connected to the gNB 200 via an NG interface which is an interface between the base station and the core network.

Figure 2:
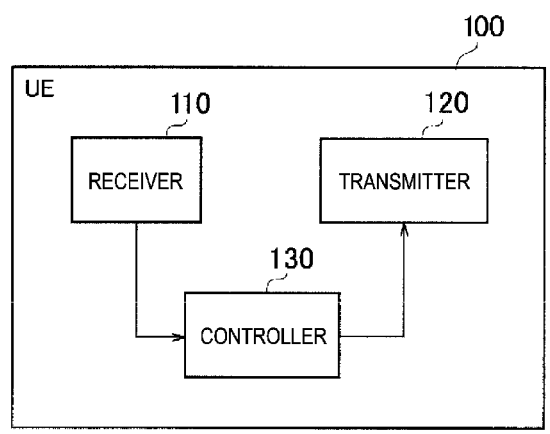
FIG. 2 is a diagram illustrating a configuration of a UE 100.

FIG. 2 is a diagram illustrating a configuration of the UE 100 (a user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received through the antenna into a baseband signal (a reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes.

Figure 3:
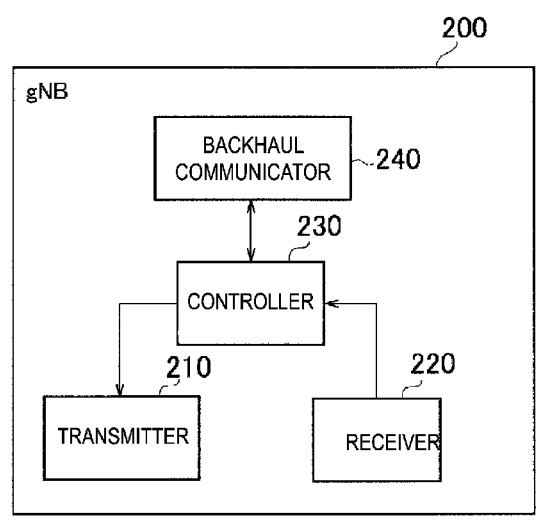
FIG. 3 is a diagram illustrating a configuration of a base station 200.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various types of control for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes.

The backhaul communicator 240 is connected to a neighboring base station via the inter-base station interface. The backhaul communicator 240 is connected to the AMF/UPF 300 via the interface between the base station and the core network. Note that the gNB may include a Central Unit (CU) and a Distributed Unit (DU) (i.e., functions are divided), and the two units may be connected via an F1 interface.

Figure 4:
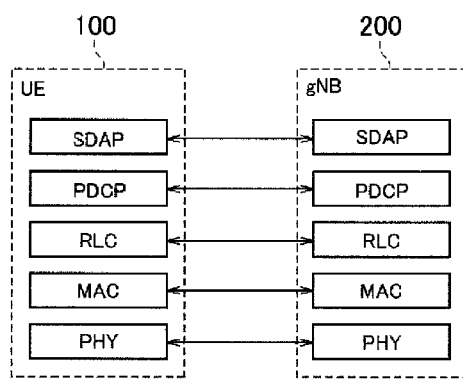
FIG. 4 is a diagram illustrating a configuration of a protocol stack of a radio interface of a user plane.

FIG. 4 is a diagram illustrating a configuration of a protocol stack of a radio interface of a user plane for handling data.

As illustrated in FIG. 4, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

In the PHY layer, a frame structure is used that includes radio frames, subframes, slots, and symbols. The radio frame includes 10 subframes on a time axis. Each subframe has a length of 1 ms. Each subframe includes a plurality of slots. Each slot includes a plurality of symbols. Each subframe includes a plurality of resource blocks (RBs) on a frequency axis. Each resource block includes a plurality of subcarriers on the frequency axis. Among the radio resources (time and frequency resources) allocated to the UE 100, frequency resources can be identified by resource blocks, and time resources can be identified by subframes (or slots or symbols).

In a downlink, a section of first several symbols of each subframe is a region used as a Physical Downlink Control Channel (PDCCH) for mainly transmitting downlink control information. The remaining portion of each subframe is a region that can be used as a Physical Downlink Shared Channel (PDSCH) for mainly transmitting downlink data.

The MAC layer performs priority control of data, a retransmission process through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow which is a unit of QoS control by the core network and a radio bearer which is a unit of QoS control by an Access Stratum (AS). Note that, when the RAN is connected to the EPC, the SDAP may not be provided.

Figure 5:
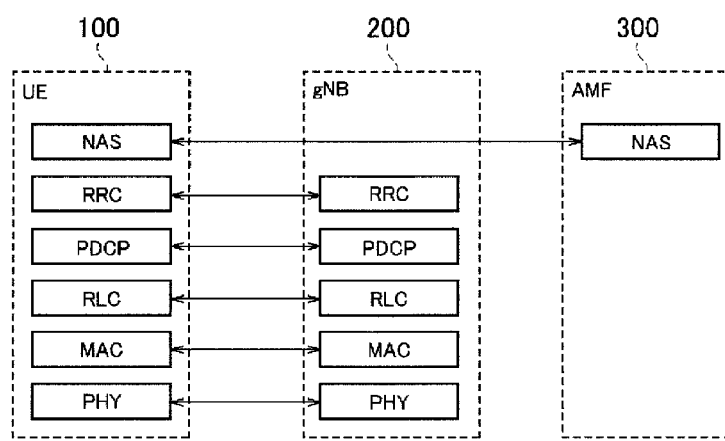
FIG. 5 is a diagram illustrating a configuration of a protocol stack of a radio interface of a control plane.

FIG. 5 is a diagram illustrating a configuration of a protocol stack of a radio interface in a control plane handling signaling (control signals).

As illustrated in FIG. 5, the protocol stack of the radio interface in the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. In a case that a connection (RRC connection) is present between the RRC of the UE 100 and the RRC of the gNB 200, the UE 100 is in an RRC connected state. When there is no connection (RRC connection) between the RRC of the UE 100 and the RRC of the gNB 200, the UE 100 is in an RRC idle state. When the RRC connection is interrupted (suspended), the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Carrier Aggregation

An overview of carrier aggregation (CA) will be described.

In CA, the UE 100 including a plurality of transceivers is configured to use a plurality of cells managed by one base station 200. The plurality of cells include one primary cell (PCell) and at least one secondary cell (SCell). One SCell is configured with at least downlink resources. One SCell may be configured with uplink resources, or may not be configured with uplink resources.

The UE 100 configures the SCell(s), based on configuration information from the base station 200. An index is assigned to each of the SCell(s) configured for the UE 100. The initial state of the SCell configured for the UE 100 may be an activated state, or may be a deactivated state.

The UE 100 activates/deactivates the SCell in response to an indication from the base station 200.

Here, to activate the SCell is to transition the SCell to the activated state. To deactivate the SCell is to transition the SCell to the deactivated state.

In the SCell in the activated state, the UE 100 performs transmission of a sounding reference signal (SRS), measurement and report of channel state information (CSI), monitoring of a PDCCH, and the like.

A CSI report includes a channel quality information (CQI) report, a precoding matrix indicator (PMI) report, and a rank indicator (RI) report. The UE 100 measures a CSI reference signal (CSI-RS) transmitted from the base station 200, and determines CQI, PMI, RI, or the like to report, based on measurement results. The base station 200 schedules the UE 100 (for example, allocates downlink resources to the UE 100, selects a modulation and coding scheme (MCS), and the like), based on the CSI report received from the UE 100.

In the SCell in the deactivated state, the UE 100 does not perform transmission of a sounding reference signal (SRS), measurement and report of CSI, monitoring of a PDCCH, and the like.

Figure 6:
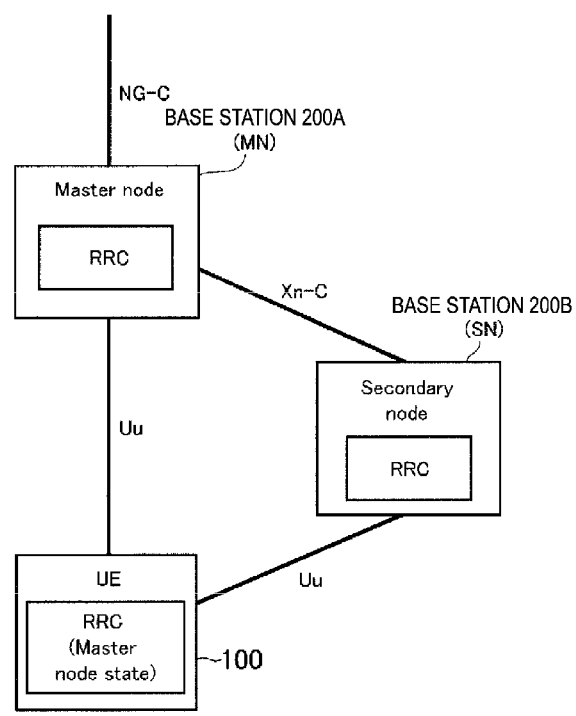
FIG. 6 is a diagram illustrating an example of DC.

Dual Connectivity A summary of dual connectivity (DC) will be described. In the following, DC including NR access is mainly assumed. Such DC may be referred to as Multi-RAT DC (MR-DC) or Multi-connectivity. FIG. 6 is a diagram illustrating an example of DC.

As illustrated in FIG. 6, in DC, the UE 100 including a plurality of transceivers is configured to utilize resources provided by two different nodes (two different base stations). One base station provides NR access and the other base station provides E-UTRA (LTE) or NR access. In the example illustrated in FIG. 6, a base station 200A may be an eNB or a gNB, and a base station 200B may be an eNB or a gNB.

One base station 200A functions as a master node (MN), and the other base station 200B functions as a secondary node (SN). The MN is a radio access node that provides control plane connection to the core network. The MN may be referred to as a master base station. The SN is a radio access node that does not have control plane connection to the core network. The SN may be referred to as a secondary base station.

The MN and the SN are connected via a network interface (inter-base station interface), and at least the MN is connected to the core network. FIG. 6 illustrates an example in which the inter-base station interface is an Xn interface; however, the inter-base station interface may be an X2 interface. The MN and the SN transmit and/or receive various pieces of information described later via the inter-base station interface.

A group of serving cells that are cells of the MN and are configured for the UE 100 is referred to as a master cell group (MCG). On the other hand, a group of serving cells that are cells of the SN and are configured for the UE 100 is referred to as a secondary cell group (SCG). A cell belonging to the SCG is referred to as SCG Cell.

The SCG includes a primary SCG Cell (PSCell), and zero or a plurality of SCells. In other words, the SCG may include only the PSCell.

For the PSCell, physical uplink control channel (PUCCH) resources are configured. The UE 100 transmits a CSI report related to some SCells belonging to the SCG on the PUCCH of the PSCell. The UE 100 performs a random access (RA) procedure for the PSCell when a new SCG is configured.

First Embodiment

Operations of the mobile communication system according to a first embodiment will be described assuming the configuration of the mobile communication system as described above.

The first embodiment is an embodiment related to transmitting, by the UE 100, information indicating any one of operation of activating the SCell configured for the UE 100, operation of deactivating the SCell configured for the UE 100, and operation of configuring the SCell for the UE 100 to the base station 200 as desired operation related to the SCell.

Operation Examples 1 to 3 according to the first embodiment will be described below.

Operation Example 1

Figure 7:
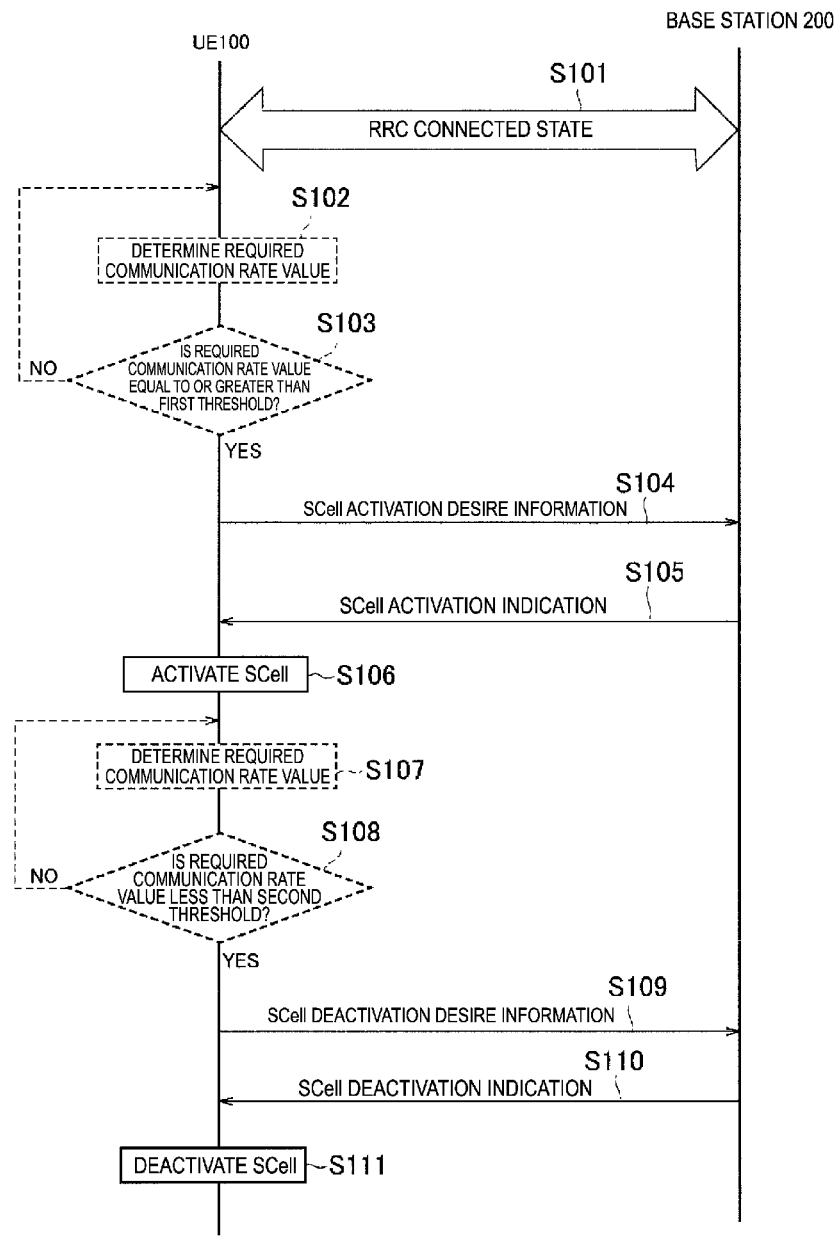
FIG. 7 is a diagram illustrating operations of Operation Example 1 according to a first embodiment.

Operation Example 1 is an operation example related to transmitting, by the UE 100 transmits, information indicating the operation of activating the SCell configured for the UE 100 or the operation of deactivating the SCell configured for the UE 100 to the base station 200 as the desired operation related to the SCell. FIG. 7 is a diagram illustrating operations of Operation Example 1.

As illustrated in FIG. 7, in Step S101, the UE 100 establishes RRC connection with the base station 200 and is in an RRC connected state. Here, at least one SCell to be deactivated is configured for the UE 100 by the base station 200, and the UE 100 communicates with the base station 200. The SCell is managed by the base station 200. One or a plurality of SCells to be activated is configured for the UE 100 by the base station 200.

In Step S102, the UE 100 determines a rate value (hereinafter referred to as a "required communication rate value") indicating a communication rate required by the UE 100. The communication rate may be throughput, or may be a data transmission rate.

The UE 100 may determine a value indicating a communication rate required by the UE 100, based on an application currently activated. The UE 100 may determine a total value of the communication rate values required by respective applications currently activated, as the required communication rate value. The UE 100 may determine a maximum value of the communication rate values required by the respective applications currently activated, as the required communication rate value. The UE 100 may determine the required communication rate value, based on a utilization (or usage) of a CPU, a utilization (or usage) of a memory, and the like.

In Step S103, the UE 100 determines whether the required communication rate value is equal to or higher than a first threshold. The UE 100 may configure the first threshold, based on threshold information received from the base station 200. The UE 100 may autonomously configure the first threshold. For example, based on radio quality (RSRP, RSRQ, SINR, or the like), a bandwidth, and the like of the current serving cell, the UE 100 may predict a maximum communication rate provided by the serving cell, and configure the maximum communication rate as the first threshold. When the UE 100 includes a plurality of serving cells (activated serving cells), the UE 100 may predict the maximum communication rate of each of the plurality of serving cells, and configure a total value of the maximum communication rates of the serving cells as the first threshold.

When the UE 100 determines that the required communication rate value is equal to or higher than the first threshold (Step S103: YES), the UE 100 advances the processing to Step S104.

In Step S104, the UE 100 transmits, to the base station 200, information (hereinafter referred to as "SCell activation desire information") indicating the operation of activating the SCell configured for the UE 100 as the desired operation related to the SCell. This allows the base station 200 to know that the UE 100 desires activation of the SCell configured for the UE 100.

The UE 100 may transmit the SCell activation desire information in an RRC message (for example, a UE assist information message), or may transmit the SCell activation desire information in a MAC CE.

The UE 100 may further transmit information indicating the required communication rate value together with the SCell activation desire information. This allows the base station 200 to know the communication rate required by the UE 100, and activate the SCell that can provide the communication rate.

The UE 100 may further transmit a measurement report including radio quality regarding each deactivated SCell together with the SCell activation desire information. This allows the base station 200 to identify an SCell having satisfactory radio quality and activate the SCell.

The UE 100 may transmit the SCell activation desire information in a manner of allowing the SCell, desired to be activated, to be identified. This allows the base station 200 to identify the SCell desired to be activated by the UE 100. Based on radio quality, a bandwidth, and the like of each deactivated SCell, the UE 100 may determine the SCell that can provide the required communication rate out of the deactivated SCells, as the SCell desired to be activated.

When the UE 100 transmits the SCell activation desire information in a manner of allowing the SCell, desired to be activated, to be identified, the UE 100 may transmit a cell identifier or an index of the SCell desired to be activated, together with the SCell activation desire information. The UE 100 may transmit the cell identifier or the index of the SCell desired to be activated, as the SCell activation desire information.

The UE 100 may generate a MAC CE including a field corresponding to the index of each of the SCells configured for the UE 100, configure a value of the field corresponding to the index of the SCell desired to be activated to "1", and transmit the MAC CE.

In Step S105, the UE 100 receives an SCell activation indication for indicating activation of one or a plurality of SCells from the base station 200.

In Step S106, the UE 100 activates the one or plurality of SCells in response to the SCell activation indication.

In Step S107, the UE 100 determines the required communication rate value in a manner same as, and/or similar to the processing in Step S102.

In Step S108, the UE 100 determines whether the required communication rate value is less than a second threshold. The UE 100 may configure the second threshold, based on threshold information received from the base station 200. The UE 100 may autonomously configure the second threshold. The second threshold may be a value same as, and/or similar to the first threshold in Step S103.

When the UE 100 determines that the required communication rate value is less than the second threshold (Step S108: YES), the UE 100 causes the processing to proceed to Step S109.

In Step S109, the UE 100 transmits, to the base station 200, information (hereinafter referred to as "SCell deactivation desire information") indicating the operation of deactivating the SCell configured for the UE 100, as the desired operation related to the SCell. This allows the base station 200 to know that the UE 100 desires deactivation of the SCell configured for the UE 100.

The UE 100 may transmit the SCell deactivation desire information in an RRC message (for example, a UE assist information message), or may transmit the SCell deactivation desire information in a MAC CE.

The UE 100 may further transmit information indicating the required communication rate value together with the SCell deactivation desire information. This allows the base station 200 to know the communication rate required by the UE 100 and activate the SCell that can provide the communication rate and deactivate other SCells.

The UE 100 may further transmit a measurement report including radio quality regarding activated SCells together with the SCell deactivation desire information. This allows the base station 200 to identify an SCell having poor radio quality and deactivate the SCell.

The UE 100 may transmit the SCell deactivation desire information in a manner of allowing the SCell, desired to be deactivated, to be identified. This allows the base station 200 to identify the SCell desired, by the UE 100, to be deactivated. Based on radio quality, a bandwidth, and the like of each of the activated SCells, the UE 100 may determine the SCell that can provide the required communication rate, and determine SCells other than the SCell as the SCells desired to be deactivated.

When the UE 100 transmits the SCell deactivation desire information in a manner of allowing the SCell, desired to be deactivated, to be identified, the UE 100 may transmit a cell identifier or an index of the SCell desired to be deactivated, together with the SCell deactivation desire information. The UE 100 may transmit the cell identifier or the index of the SCell desired to be deactivated, as the SCell deactivation desire information.

The UE 100 may generate a MAC CE including a field corresponding to the index of each of the SCells configured for the UE 100, configure a value of the field corresponding to the index of the SCell desired to be deactivated to "0", and transmit the MAC CE.

In Step S110, the UE 100 receives an SCell deactivation indication for indicating deactivation of one or a plurality of SCells from the base station 200.

In Step S111, the UE 100 deactivates the one or plurality of SCells in response to the SCell deactivation indication.

In Operation Example 1, the UE 100 may omit the processing of Step S102 to Step S103 and/or Step S107 to Step S108. When the processing of Step S102 to Step S103 is omitted, and activation of the SCell is required, the UE 100 transmits the SCell activation desire information to the base station 200. When the processing of Step S107 to Step S108 is omitted, and deactivation of the SCell is required, the UE 100 transmits the SCell deactivation desire information to the base station 200.

In Operation Example 1, when a rate value indicating a communication rate required in a certain future period is equal to or higher than the first threshold, the UE 100 may transmit SCell activation desire information. Alternatively, when an amount of transmission data generated in a certain future period is equal to or higher than a first data amount, the UE 100 may transmit the SCell activation desire information. The certain period is represented by the number of milliseconds or the number of subframes. The certain period is configured by the base station 200. The first data amount is configured by the base station 200.

In Operation Example 1, when the rate value indicating the communication rate required in the certain future period is equal to or higher than the first threshold, or when the amount of transmission data generated in the certain future period is equal to or higher than a predetermined value, the UE 100 may transmit a notification of a large-amount data communication prediction to the base station 200 instead of the SCell activation desire information. When the base station 200 receives the notification of the large-amount data communication prediction from the UE 100, the base station 200 may consider that the UE 100 desires activation of the SCell configured for the UE 100, and transmit the SCell activation indication to the UE 100.

In Operation Example 1, when the rate value indicating the communication rate required in the certain future period is less than the second threshold, the UE 100 may transmit the SCell deactivation desire information. Alternatively, when the amount of transmission data generated in the certain future period is less than a second data amount, the UE 100 may transmit the SCell deactivation desire information. The second data amount is configured by the base station 200.

In Operation Example 1, when the rate value indicating the communication rate required in the certain future period is less than the second threshold, or when the amount of transmission data generated in the certain future period is less than the second data amount, the UE 100 may transmit a notification of a small-amount data communication prediction to the base station 200 instead of the SCell deactivation desire information. When the base station 200 receives the notification of the small-amount data communication prediction from the UE 100, the base station 200 may consider that the UE 100 desires deactivation of the SCell configured for the UE 100, and transmit the SCell deactivation indication to the UE 100.

In Operation Example 1, each of the thresholds (the first threshold, the second threshold, the first data amount, or the second data amount) may be configured for uplink communication and downlink communication separately. The UE 100 determines the required communication rate value and/or the amount of transmission data for uplink communication and downlink communication separately, and makes a comparison with a corresponding threshold.

For example, when the required communication rate value in uplink communication is equal to or higher than the first threshold configured for the uplink communication, the UE 100 transmits information indicating operation of activating the SCell configured with uplink resources, as the desired operation related to the SCell. When the required communication rate value in uplink communication is less than the second threshold configured for the uplink communication, the UE 100 transmits information indicating operation of deactivating the SCell configured with uplink resources, as the desired operation related to the SCell.

Operation Example 2

Figure 8:
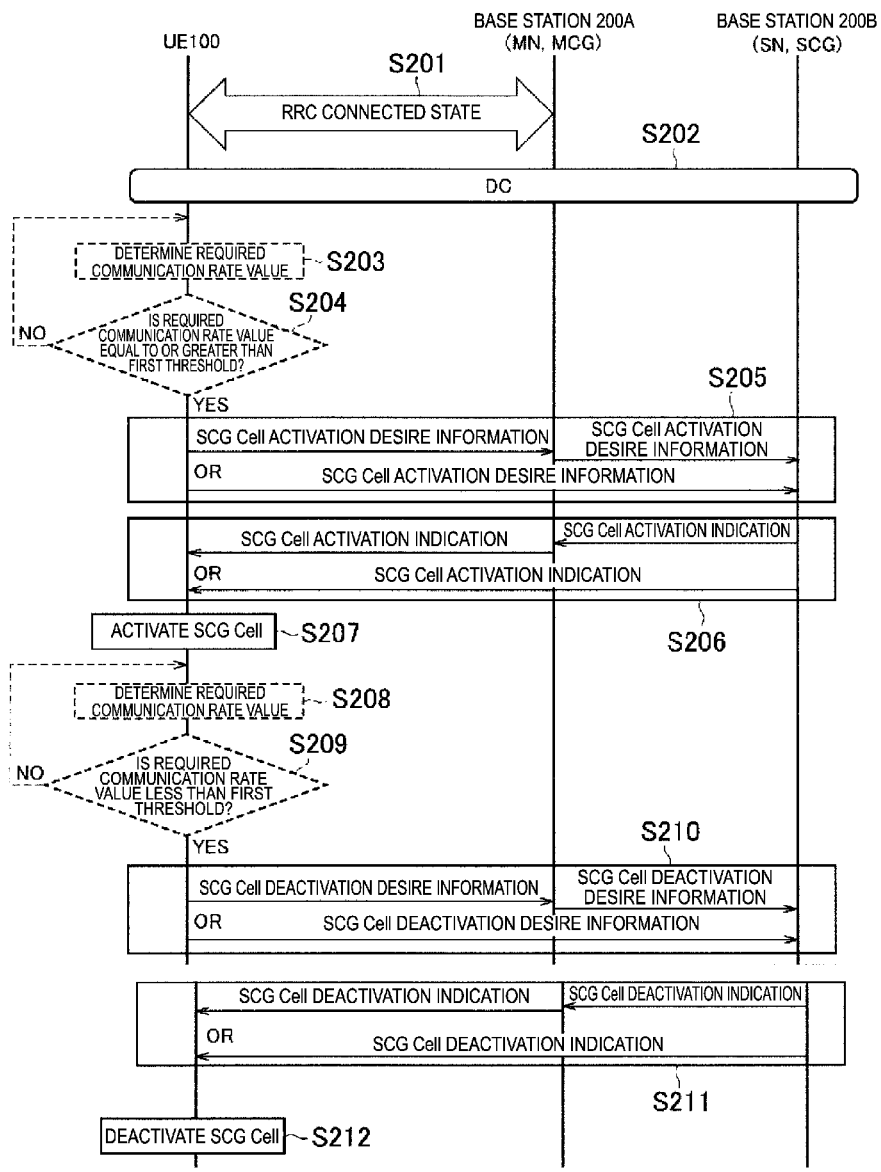
FIG. 8 is a diagram illustrating operations of Operation Example 2 according to the first embodiment.

Differences of Operation Example 2 from Operation Example 1 will be mainly described. Operation Example 2 is an operation example related to transmission of information indicating operation of activating the SCG Cell configured for the UE 100 or operation of deactivating the SCG Cell configured for the UE 100 as the desired operation related to the SCell. FIG. 8 is a diagram illustrating operations of Operation Example 2.

As illustrated in FIG. 8, in Step S201, the UE 100 establishes RRC connection with a base station 200A and is in an RRC connected state.

In Step S202, the UE 100 initiates DC communication with the base station 200A and a base station 200B. Here, for the UE 100, at least one SCG Cell to be deactivated is configured. The base station 200A functions as an MN of the UE 100, and the base station 200B functions as an SN of the UE 100.

The processing in Step S203 to Step S204 is the same as, and/or similar to the processing in Step S102 to Step S103.

In Step S205, the UE 100 transmits, to the base station 200A or the base station 200B, information (hereinafter referred to as "SCG Cell activation desire information") indicating the operation of activating the SCG Cell configured for the UE 100 as the desired operation related to the SCell.

In a manner same as, and/or similar to Step S104, in Step S205, the UE 100 may further transmit information indicating the required communication rate value together with the SCG Cell activation desire information. The UE 100 may further transmit a measurement report including radio quality regarding deactivated SCG Cells, together with the SCG Cell activation desire information. The UE 100 may transmit the SCG Cell activation desire information in a manner of allowing the SCG Cell, desired to be activated, to be identified.

When the UE 100 transmits the SCG Cell activation desire information to the base station 200A, the UE 100 transmits the SCG Cell activation desire information in an RRC message (for example, a UE assist information message). In this case, the base station 200A transfers the SCG Cell activation desire information to the base station 200B.

When the UE 100 transmits the SCG Cell activation desire information to the base station 200B, the UE 100 may transmit the SCG Cell activation desire information in an RRC message via an SRB 3, or may transmit the SCG Cell activation desire information in a MAC CE. The SRB 3 refers to a radio bearer for control established between the UE 100 and the SN. The UE 100 may generate a MAC CE including a field corresponding to the index of each of the SCG Cells configured for the UE 100, configure a value of the field corresponding to the index of the SCG Cell desired to be activated to "1", and transmit the MAC CE.

In Step S206, the UE 100 receives an SCG Cell activation indication for indicating activation of one or a plurality of SCG Cells from the base station 200A or the base station 200B. When the UE 100 receives the SCG Cell activation indication from the base station 200A, the SCG Cell activation indication is transmitted from the base station 200B to the base station 200A, and is then transmitted to the UE 100.

In Step S207, the UE 100 activates the one or plurality of SCG Cells in response to the SCG Cell activation indication.

The processing in Step S208 to Step S209 is the same as, and/or similar to the processing in Step S107 to Step S108.

In Step S210, the UE 100 transmits, to the base station 200A or the base station 200B, information (hereinafter referred to as "SCG Cell deactivation desire information") indicating the operation of deactivating the SCG Cell configured for the UE 100, as the desired operation related to the SCell. This allows the base station 200A or the base station 200B to know that the UE 100 desires deactivation of the SCG Cell configured for the UE 100.

In a manner same as, and/or similar to Step S109, in Step S210, the UE 100 may further transmit information indicating the required communication rate value, together with the SCG Cell deactivation desire information. The UE 100 may further transmit a measurement report including radio quality regarding activated SCG Cells, together with the SCG Cell deactivation desire information. The UE 100 may transmit the SCG Cell deactivation desire information in a manner of allowing the SCG Cell, desired to be deactivated, to be identified.

When the UE 100 transmits the SCG Cell deactivation desire information to the base station 200A, the UE 100 transmits the SCG Cell deactivation desire information in an RRC message (for example, a UE assist information message). In this case, the base station 200A transfers the SCG Cell deactivation desire information to the base station 200B.

When the UE 100 transmits the SCG Cell deactivation desire information to the base station 200B, the UE 100 may transmit the SCG Cell deactivation desire information in an RRC message via the SRB 3, or may transmit the SCG Cell deactivation desire information in a MAC CE. The UE 100 may generate a MAC CE including a field corresponding to the index of each of the SCG Cells configured for the UE 100, configure a value of the field corresponding to the index of the SCG Cell desired to be deactivated to "0", and transmit the MAC CE.

In Step S211, the UE 100 receives an SCG Cell deactivation indication for indicating deactivation of one or a plurality of SCG Cells from the base station 200A or the base station 200B. When the UE 100 receives the SCG Cell deactivation indication from the base station 200A, the SCG Cell deactivation indication is transmitted from the base station 200B to the base station 200A, and is then transmitted to the UE 100.

In Step S212, the UE 100 deactivates the one or plurality of SCG Cells in response to the SCG Cell deactivation indication.

In Operation Example 2, the UE 100 may transmit information indicating that the UE 100 desires activation of the SCG (that is, activation of all of the cells belonging to the SCG) as the SCG Cell activation desire information.

In Operation Example 2, the UE 100 may transmit information indicating that the UE 100 desires deactivation of the SCG (that is, deactivation of all of the cells belonging to the SCG) as the SCG Cell deactivation desire information.

Figure 9:
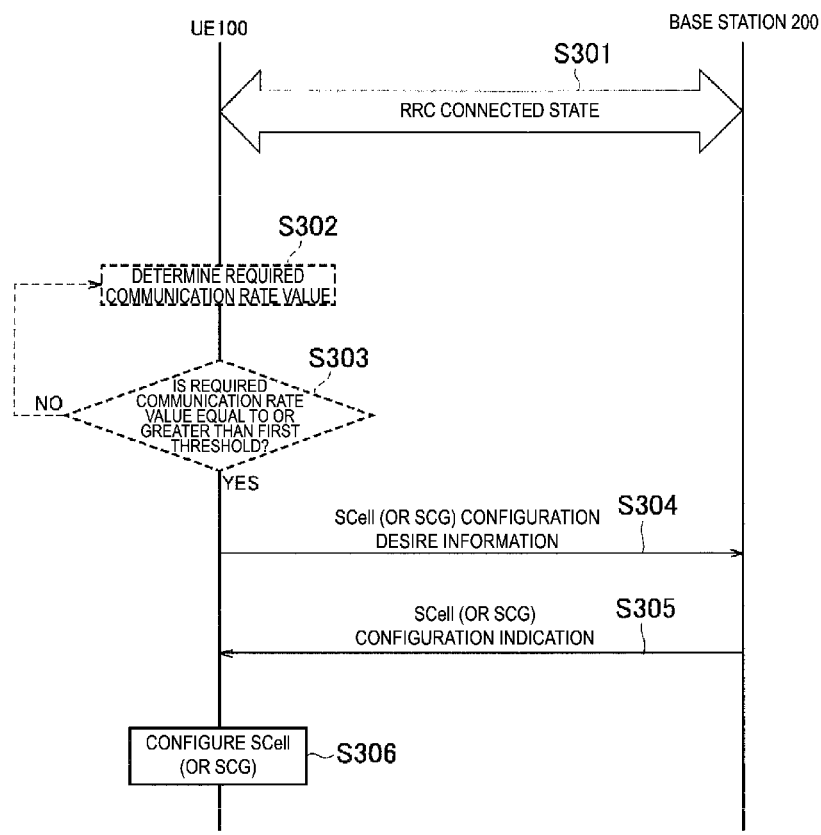
FIG. 9 is a diagram illustrating operations of Operation Example 3 according to the first embodiment.

Operation Example 3 Differences of Operation Example 3 from Operation Example 1 will be mainly described. Operation Example 3 is an operation example related to transmission of information indicating operation of configuring the SCell for the UE 100 as the desired operation related to the SCell. FIG. 9 is a diagram illustrating operations of Operation Example 3.

As illustrated in FIG. 9, in Step S301, the UE 100 establishes RRC connection with the base station 200 and is in an RRC connected mode. The UE 100 is not configured with SCells (that is, neither CA nor DC is configured), and performs wireless communication with the base station 200 via only one serving cell.

The processing in Step S302 to Step S303 is the same as, and/or similar to the processing in Step S102 to Step S103.

In Step S304, the UE 100 transmits, to the base station 200, information (hereinafter referred to as "SCell configuration desire information") indicating that the UE 100 desires operation of configuring the SCell for the UE 100 (that is, operation of configuring CA for the UE 100) as the desired operation related to the SCell. This allows the base station 200 to know that the UE 100 desires configuration of the SCell for the UE 100.

The UE 100 may transmit the SCell configuration desire information in an RRC message (for example, a UE assist information message), or may transmit the SCell configuration desire information in a MAC CE.

The UE 100 may transmit a candidate cell list including cell identifiers of candidate cells together with the SCell configuration desire information. The candidate cell list may include information indicating radio quality of each of the candidate cells. The UE 100 may determine cells having quality that satisfies predetermined quality criteria (S-criteria or R-criteria), as the candidate cells. This allows the base station 200 to configure cells having satisfactory radio quality for the UE 100 as the SCells, based on the candidate cell list.

The UE 100 may further transmit information indicating the required communication rate value together with the SCell configuration desire information. This allows the base station 200 to configure cells that can provide the communication rate indicated by the required communication rate value for the UE 100 as the SCells.

When the UE 100 supports DC, the UE 100 may transmit, to the base station 200, information (hereinafter referred to as "SCG configuration desire information") indicating that the UE 100 desires operation of configuring the SCG for the UE 100 (that is, configuring DC for the UE 100) as the desired operation related to the SCell. This allows the base station 200 to know that the UE 100 desires configuration of the SCG for the UE 100.

The UE 100 may transmit information indicating the above-described candidate cell list and/or required communication rate value together with the SCG configuration desire information. The base station 200 can configure an appropriate cell(s) for the UE 100 as the PSCell (and the SCells belonging to the SCG), based on these pieces of information.

In Step S305, the UE 100 receives an indication for configuring the SCells or the SCG from the base station 200.

In Step S306, the UE 100 configures the SCells or the SCG in response to the indication.

Second Embodiment

Operations according to a second embodiment will be described. The second embodiment is an embodiment related to intermittent activation of the SCell configured for the UE 100. By intermittently activating the SCell, power consumption of the UE 100 can be reduced.

Figure 10:
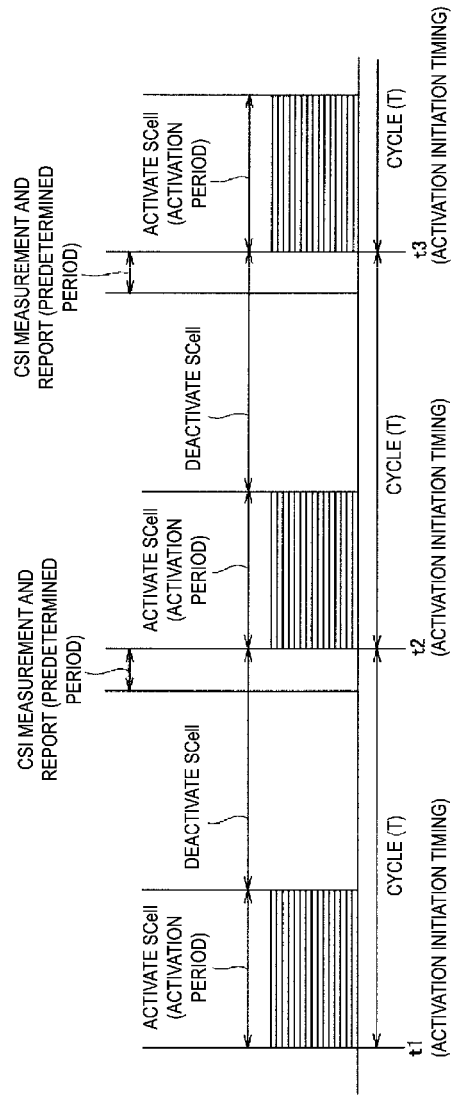
FIG. 10 is a diagram illustrating operations of intermittent activation of an SCell according to a second embodiment.

Operations of intermittent activation of the SCell will be described. FIG. 10 is a diagram illustrating operations of intermittent activation of the SCell.

As illustrated in FIG. 10, the UE 100 performs operations of intermittent activation for the SCell to be configured. Specifically, the UE 100 activates the SCell at activation initiation timing (t1, t2, t3 . . . ) that occurs every cycle (T). The UE 100 continues to have the SCell activated in an activation period in one cycle (T). The UE 100 deactivates the SCell in a period other than the activation period in one cycle (T).

In a predetermined period immediately before the activation initiation timing, the UE 100 may perform CSI measurement and report related to the SCell while maintaining deactivation of the SCell. This allows the base station 200 managing the SCell to schedule the UE 100 (assign downlink resources to the UE 100, select an MCS, and the like) immediately after the SCell is activated.

In the predetermined period immediately before the activation initiation timing, the UE 100 may transmit an SRS in the SCell while maintaining deactivation of the SCell. This allows the base station 200 managing the SCell to know uplink channel quality of the UE 100 and allocate appropriate uplink resources to the UE 100, immediately after the SCell is activated. When the UE 100 does not perform uplink transmission, the UE 100 need not transmit the SRS.

The above-described activation initiation timing, cycle (T), activation period, and predetermined period are configured for the UE 100 by the base station 200. Radio resources (hereinafter referred to as "radio resources for CSI") for performing CSI measurement and report in the predetermined period are configured by the base station 200. The radio resources for CSI include radio resources for transmitting a CSI-RS and radio resources for transmitting a CSI report.

The activation initiation timing may be represented by a radio frame number and a subframe number, or may be represented by a slot number or a symbol number in addition to the radio frame number and the subframe number.

The cycle (T), the activation period, and the predetermined period are represented by the number of milliseconds or the number of subframes.

The activation period may be dynamically extended. For example, when the UE 100 receives downlink user data or transmits uplink data in the activation period, the UE 100 starts a timer. While the timer is running, the UE 100 continues to have the SCell activated. In other words, the activation period is extended until timing of timer expiry. A value of the timer is configured by the base station 200.

For example, when the UE 100 receives a PDCCH transmitted to the UE 100 in the activation period, the UE 100 starts the timer. When the UE 100 transmits an scheduling request (SR) and/or a buffer status report (BSR) in the activation period, the UE 100 may start the timer.

When the UE 100 performs DC with the base station 200A (MN) and the base station 200B (SN), the operations of intermittent activation may be applied to the SCG Cells. The operations of intermittent activation may be applied to the PSCell in the SCG Cells.

In the second embodiment, the UE 100 receives information (hereinafter referred to as "intermittent activation configuration information") for configuring operations of intermittent activation of the SCell by the base station 200, and performs the above-described operations of intermittent activation of the SCell, based on the intermittent activation configuration information. The intermittent activation configuration information includes identification information of the SCell (an identifier or an index of the SCell) to be subjected to intermittent activation, and information indicating parameters (the activation initiation timing, the cycle (T), the activation period, the predetermined period, and the timer value) related to the operations of intermittent activation.

When the operations of intermittent activation are applied to the SCG Cells, the intermittent activation configuration information may be transmitted from the base station 200A to the UE 100 and the base station 200B. The intermittent activation configuration information may be transmitted from the base station 200B to the UE 100 via the SRB 3. The UE 100 may transmit the intermittent activation configuration information received from the base station 200B to the base station 200A.

Third Embodiment

Operations according to a third embodiment will be described. The third embodiment is an embodiment related to transition of the PSCell configured for the UE 100 to a dormant state. By transitioning the PSCell to a dormant state, power consumption of the UE 100 can be reduced.

The UE 100 does not monitor the PDCCH in the PSCell in the dormant state, but may measure the CSI regarding the PSCell. Regarding the PSCell in the dormant state, the UE 100 may perform automatic gain control (AGC) and beam management (measurement and selection of a beam, beam failure recovery, and the like).

Figure 11:
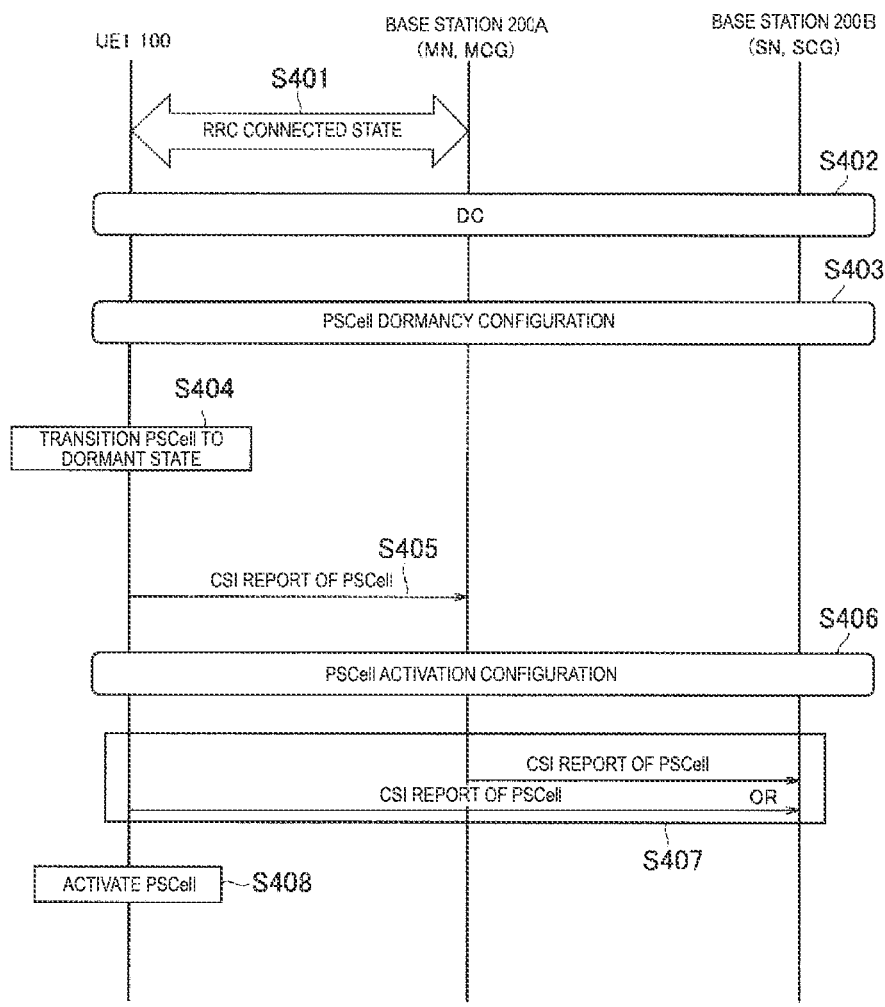
FIG. 11 is a diagram illustrating operations according to a third embodiment.

FIG. 11 is a diagram illustrating operations according to the third embodiment.

As illustrated in FIG. 11, in Step S401, the UE 100 establishes RRC connection with a base station 200A and is in an RRC connected state.

In Step S402, the UE 100 initiates DC communication with the base station 200A and a base station 200B.

In Step S403, the base station 200A transmits, to the UE 100, PSCell dormancy configuration information for transitioning the PSCell to the dormant state, in an RRC message or a MAC CE.

The PSCell dormancy configuration information includes information for determining timing (hereinafter referred to as "dormancy timing") of transitioning the PSCell to the dormant state. The UE 100 determines the dormancy timing, based on the PSCell dormancy configuration information.

For example, the PSCell dormancy configuration information includes a timer value, and the UE 100 starts a timer corresponding to the timer value in response to reception of the PSCell dormancy configuration information, and determines timing of timer expiry as the dormancy timing. In other words, the UE 100 transitions the PSCell to the dormant state at the timing of timer expiry. Alternatively, the PSCell dormancy configuration information may simply be an indication to transition the PSCell to the dormant state, and the UE 100 may determine timing of reception of such an indication as the dormancy timing.

The PSCell dormancy configuration information may be transmitted from the UE 100 or the base station 200A to the base station 200B as well. Based on the PSCell dormancy configuration information, the base station 200B knows the dormancy timing, and stops transmission of the PDCCH to the UE 100.

In Step S404, the UE 100 transitions the PSCell to the dormant state at the dormancy timing.

In Step S405, the UE 100 performs CSI measurement regarding the PSCell in the dormant state, and transmits a CSI report regarding the CSI measurement to the base station 200A. Here, the UE 100 may periodically measure and report CSI. In this case, a cycle is configured by the base station 200A.

In Step S406, the base station 200A transmits, to the UE 100, PSCell activation configuration information for activating the PSCell in an RRC message or a MAC CE.

The PSCell activation configuration information includes information for determining timing (hereinafter referred to as "activation timing") of activating the PSCell. The UE 100 determines the activation timing, based on the PSCell activation configuration information. The PSCell activation configuration information is transmitted from the base station 200A to the base station 200B as well.

In Step S408, the UE 100 activates the PSCell at the activation timing.

After transmission of the PSCell activation configuration information and before the activation timing, in Step S407, the base station 200B receives a CSI report of the PSCell from the UE 100 or the base station 200A. This allows the base station 200B to schedule the UE 100 immediately after the PSCell is activated.

When a period from the timing at which the base station 200B receives the PSCell activation configuration information to the activation timing is shorter than an allowable delay at a base station interface between the base station 200A and the base station 200B, the CSI report transmitted from the base station 200A may not reach the base station 200B before the activation timing. In this case, in Step S407, the base station 200B receives the CSI report from the UE 100.

OTHER EMBODIMENTS

A program may be provided that causes a computer to execute each process performed by the UE 100 or the base station 200 (the base station 200A, the base station 200B). The program may be recorded in a computer readable medium. Use of the computer readable medium allows the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for executing the processes to be performed by the UE 100 or the base station 200 (the base station 200A, the base station 200B) may be integrated, and at least part of the UE 100 or the base station 200 (the base station 200A, the base station 200B) may be configured as a semiconductor integrated circuit (a chipset or an SoC).

Embodiments have been described above in detail with reference to the drawings, but specific configurations are not limited to those described above, and various design variations can be made without departing from the gist of the present disclosure.

The invention claimed is:

1. A method executed in a user equipment connected to a master node and a secondary node, an MCG (Master Cell Group) being associated with the master node, an SCG (Secondary Cell Group (SCG) being associated with the secondary node, the method comprising: transmitting to the master node, information indicating that the user equipment prefers the SCG to be deactivated;
   receiving from the master node, information indicating deactivation of the SCG; and
   in response to receiving the information, controlling the user equipment to not transmit SRS (Sounding Reference Signal) on a primary SCG cell included in the SCG, not report CSI (Channel State Information) on the primary SCG cell and not monitor PDCCH on the primary SCG cell.

2. The method according to claim 1, wherein the transmitting comprises transmitting the RRC message in response to generating uplink data to be transmit.

3. A user equipment connected to a master node and a secondary node, an MCG (Master Cell Group) being associated with the master node, an SCG (Secondary Cell Group (SCG) being associated with the secondary node, the user equipment comprising:
   a transmitter configured to transmit to the master node, information indicating that the user equipment prefers the SCG to be deactivated,
   a receiver configured to receive from the master node, information indicating deactivation of the SCG, and
   a controller configured to, in response to receiving the information, control the user equipment to not transmit SRS (Sounding Reference Signal) on a primary SCG cell included in the SCG, not report CSI (Channel State Information) on the primary SCG cell and not monitor PDCCH on the primary SCG cell.

4. An apparatus controlling a user equipment connected to a master node and a secondary node, an MCG (Master Cell Group) being associated with the master node, an SCG (Secondary Cell Group (SCG) being associated with the secondary node, the apparatus comprising a processer and a memory, the processor configured to
- transmit to the master node, information indicating that the user equipment prefers the SCG to be deactivated,
- receive from the master node, information indicating deactivation of the SCG, and
- in response to receiving the information, control the user equipment to not transmit SRS (Sounding Reference Signal) on a primary SCG cell included in the SCG, not report CSI (Channel State Information) on the primary SCG cell and not monitor PDCCH on the primary SCG cell.

* * * * *